Aug. 23, 1938.    H. H. GRAINGER    2,127,995
BALANCE OR WEIGHING SCALE
Filed Jan. 9, 1936
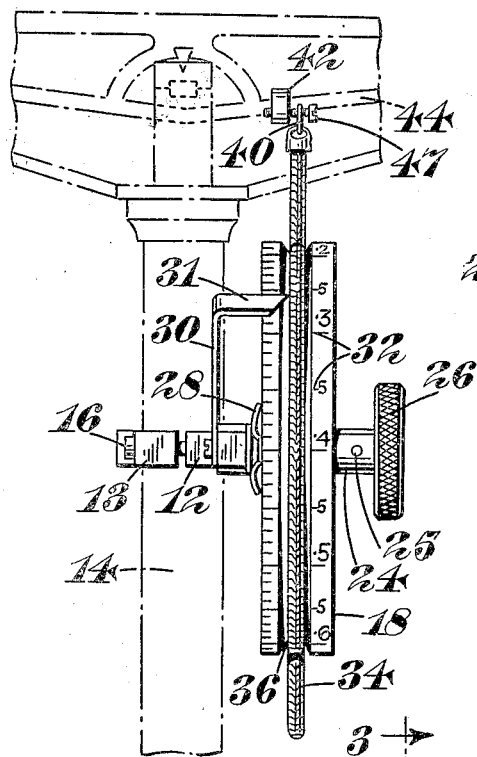
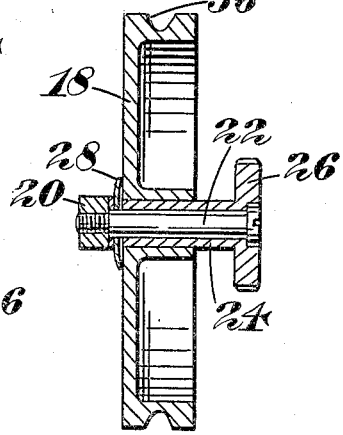
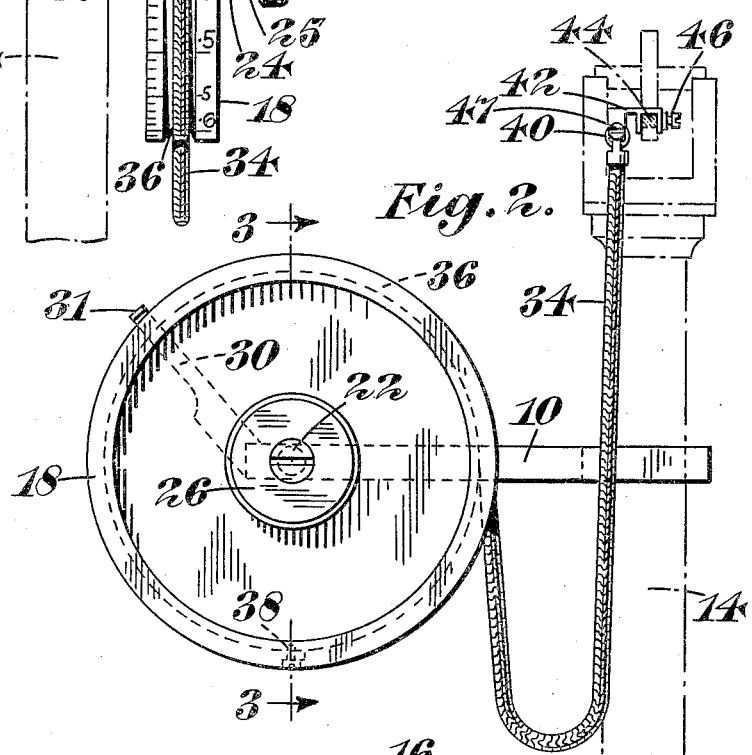
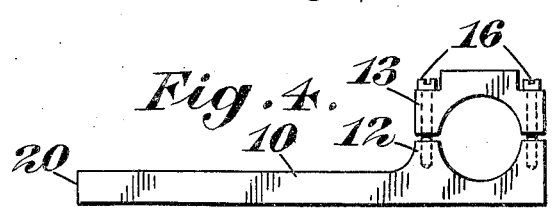
Inventor:
Hubert Henry Grainger,
By Stebbins, Blenko & Parmelee,
attys.

Patented Aug. 23, 1938

2,127,995

UNITED STATES PATENT OFFICE 2,127,995

BALANCE OR WEIGHING SCALE

Herbert Henry Grainger, London, England, assignor, by mesne assignments, to Chicago Apparatus Company, Chicago, Ill., a corporation of Illinois Application January 9, 1936, Serial No. 58,401
In Great Britain January 12, 1935

2 Claims. (Cl. 265—60)

This invention relates to balances or weighing scales of the type (hereinafter referred to as the type described) having a flexible member, e. g. a chain, hung at one end from the scale beam and attached at its second end to an adjustable member movable to vary the proportion of the flexible member which hangs from the beam, and having an indicating means for denoting weights corresponding to varying weights of flexible member suspended from the beam.

The invention has for one of its objects to provide improved means for varying the proportion of the flexible member which hangs from the beam and to enable such improved means to be readily applied to existing balances.

According to the invention there is provided a balance or weighing scales of the type described, wherein the said second end of the flexible member is attached to the periphery of a rotary member which, when rotated, winds or unwinds the flexible member on or from it, and thereby varies the weight on the beam. Such a rotary member can be readily turned for enabling additional weight to be added to one side of the beam, whether the latter is raised to permit it to oscillate or is at rest.

According to a feature of the invention, the indicating means comprises graduations on the rotary member movable in relation to an index fixed in relation thereto.

The flexible member used is preferably a chain, but if desired a cord or the like may be employed. Conveniently, the rotary member is in the form of a drum journalled so as to be free to be rotated by hand, but frictionally held against rotation by the weight of the flexible member attached to it.

The rotary member may be so mounted that its axis of rotation can be moved vertically towards and away from the beam for adjusting the initial weight of the flexible member supported by the beam, namely when as much as possible of the flexible member is wound around the rotary member.

In order that the distance of the point of attachment of the flexible member to the beam from the centre support of the balance beam may be varied, a bracket carrying one end of the flexible member may be mounted to slide along the beam, and fastening means may be provided for fixing the bracket in its position of adjustment.

According to another feature of the invention, the rotary member and the flexible member form a unitary structure arranged to be readily attached to an existing balance and the unitary structure preferably also comprises the indicating means.

One embodiment of the invention is diagrammatically illustrated by way of example in the accompanying drawing, wherein:

Figure 1 is a front elevation showing an attachment according to the invention applied to a balance indicated in broken lines;

Figure 2 is a side elevation thereof;

Figure 3 is a vertical section taken on the line 3—3 in Figure 2, the chain in the latter figure being omitted, and Figure 4 is a detail view of a supporting arm described hereinafter.

Like reference characters designate like parts throughout the several views.

Referring to the drawing a unitary structure aforesaid shown in full lines for attachment to an existing balance or weighing scales shown in broken lines, comprises a supporting arm 10, whereof one end has a boss formed in two parts 12, 13 constituting a clamp for attachment to the centre pillar 14 of the balance by means of two screws 16 securing the parts of the boss together around the pillar. A rotary member 18 in the form of a grooved drum or sheave is freely rotatable on the other end 20 of the arm 10 and can thus be readily attached to a fixed part of an existing balance. A headed stud 22 constituting an axle is screwed into the latter end 20 of the arm 10 and lies at right angles thereto, and rotatably carries a sleeve 24 having an oil hole 25. The boss of the drum is fixed on the sleeve 24 one end of which is formed as or provided with a knob 26 for use in rotating the drum, which knob is recessed to accommodate the head of the stud 22. Between the drum 18 and its supporting arm 10 is a plate spring 28 for frictionally holding the drum against unintentional rotation about its axle. An L-shaped member 30, 31 has one limb 30 secured to the end 20 of the arm 10, its other limb 31 constitutes a pointer or index extending over the periphery of the drum which is graduated in any convenient manner, as shown at 32. A flexible member in the form of a snake chain 34 has one end wound around the drum 18 and attached thereto in its groove 36, as indicated at 38, and its other end carries a link 40 by which it is suspended from a bracket 42 that is slidable along the beam 44 and can be fixed in its adjusted position by a set screw 46. A screw 47 serves to attach the chain readily detachable to the bracket 42.

By turning the knob 26 and rotating the drum 18 various weights corresponding to different lengths of chain 34 suspended from the beam 44 can be applied at will to the latter, the amount of such weights being readable at the pointer 31. The amount of this weight added by the chain to one side of the beam can be varied to agree with an actual weight in the opposite balance pan by adjusting the distance of the bracket 42 from the centre support of the beam. Also, the initial weight of the chain applied to one side of the beam can be adjusted by moving the supporting arm 10 up or down the centre pillar 14.

Various modifications may be made in the details of construction described above without departing from the invention. For example, instead of a pointer a vernier may be used, and instead of a snake chain some other form of flexible member may be employed. Also, the plane in which the drum rotates may lie at right angles to the balance beam or parallel therewith or in an intermediate position. Further, in some instances, the supporting arm of the rotary member may be fixed to a part of the case of the balance.

I claim:

1. A weight applying attachment for a balance having a beam arm and a center pillar on which said arm is fulcrumed, said attachment comprising a supporting bar, clamping means cooperating with one end of said bar for detachably clamping said bar to the center pillar, a mounting stud secured to the other end of said bar, a sleeve journaled on said stud, a calibrated drum secured to said sleeve, a weight applying cable wound about and secured at one end to the drum, a detachable clamp connected to the free end of said cable and having a generally U-shaped portion adapted to be slidably received on the beam arm and to be clamped to said beam arm, a manually operable knob formed on one end of said sleeve for rotating said drum to apply predetermined weights corresponding to different lengths of said cable to said beam arm, a spring washer on said stud and clamped between the drum and the supporting bar to frictionally retain the drum in adjusted position, and a fixed reference member cooperating with the drum.

2. A weight applying attachment for a balance having a beam arm and a center pillar on which said arm is fulcrumed, said attachment comprising a supporting bar, clamping means cooperating with one end of said bar for detachably clamping said bar to the center pillar, a mounting stud secured to the other end of said bar, a sleeve journaled on said stud, a calibrated drum secured to said sleeve, a weight applying cable wound about and secured at one end to the drum, a detachable clamp connected to the free end of said cable and having a generally U-shaped portion adapted to be slidably received on the beam arm and to be clamped to said beam arm, a manually operable knob formed on one end of said sleeve for rotating said drum to apply predetermined weights corresponding to different lengths of said cable to said beam arm, a spring washer on said stud and clamped between the drum and the supporting bar to frictionally retain the drum in adjusted position, and an L-shaped member secured to the free end of the supporting bar and providing a pointer portion overlying the periphery of the calibrated drum.

HERBERT HENRY GRAINGER.